Figure 1:
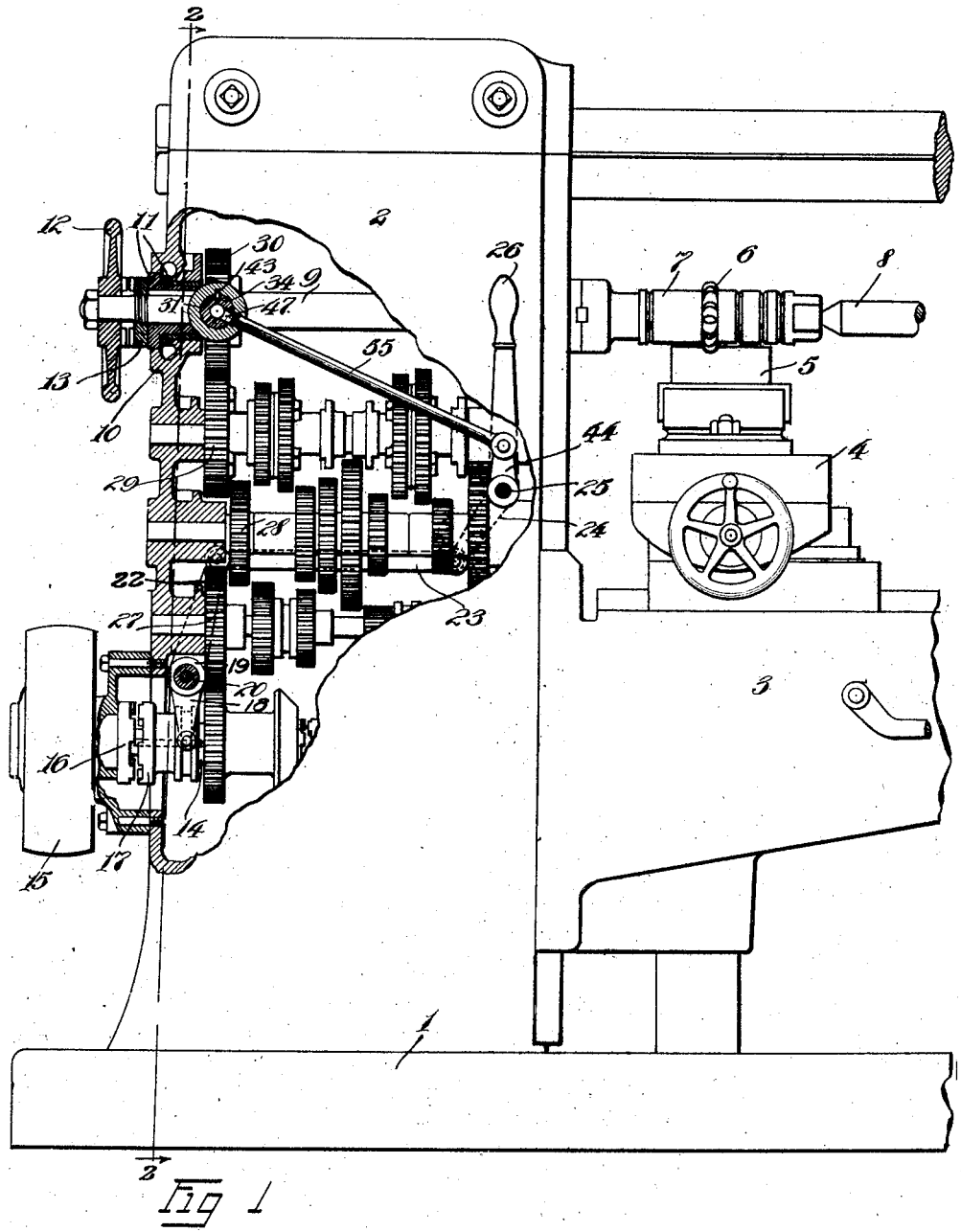

Jan. 9, 1923.

F. S. SHIELDS ET AL.
MACHINE TOOL.
FILED AUG. 9, 1917.

1,441,760.

2 SHEETS—SHEET 1.

Inventor
Frank S. Shields
John A. Cammu
By Hull, Smith, Buck & West
Attys

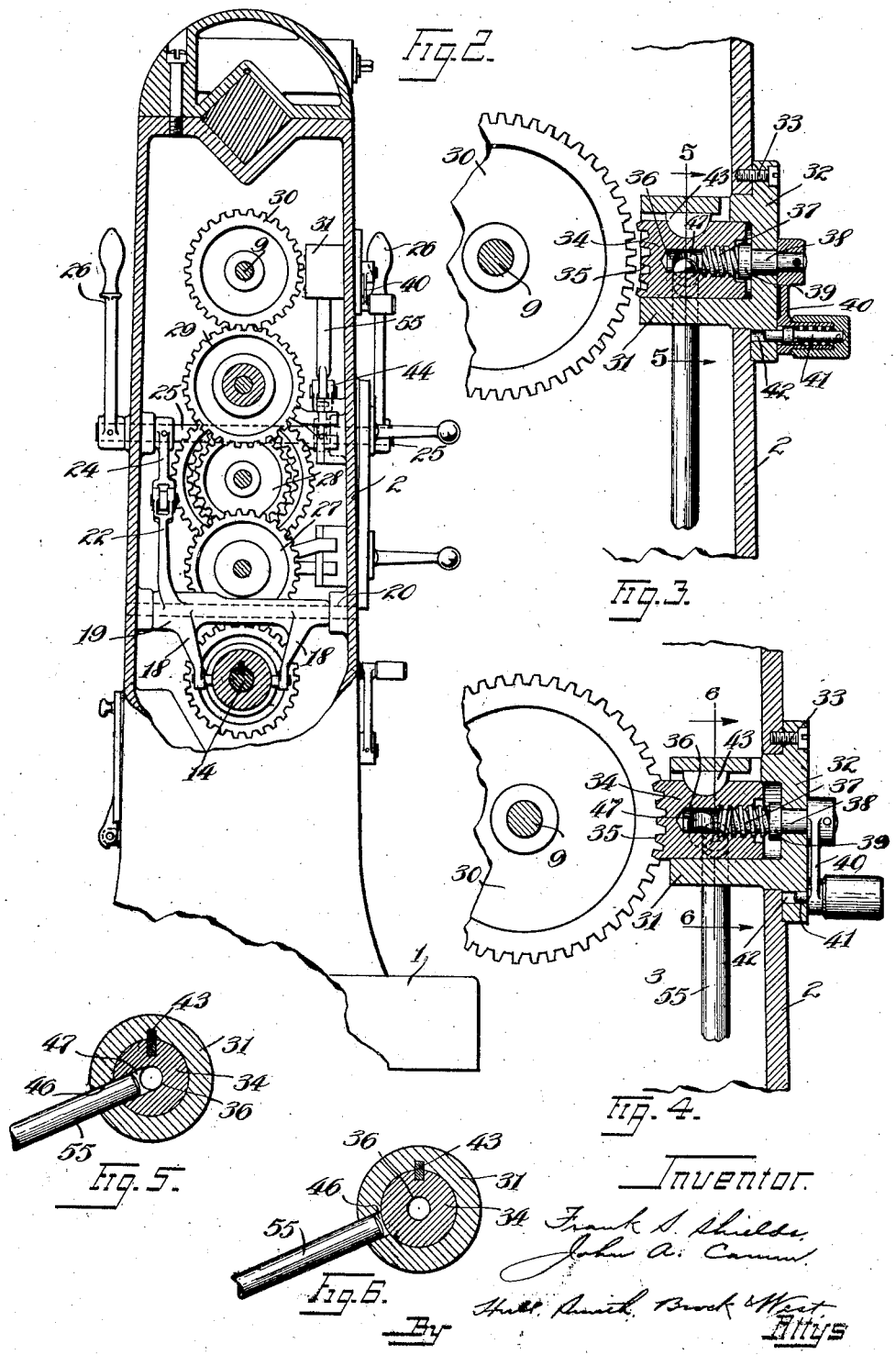

Patented Jan. 9, 1923.

1,441,760

UNITED STATES PATENT OFFICE.

FRANK S. SHIELDS AND JOHN A. CAMM, OF CLEVELAND, OHIO, ASSIGNORS, BY MESNE ASSIGNMENTS, TO THE CLARK & MESKER MILLING MACHINE COMPANY, OF CLEVELAND, OHIO, A CORPORATION OF OHIO.

MACHINE TOOL.

Application filed August 6, 1917. Serial No. 184,549.

*To all whom it may concern:*

Be it known that we, FRANK S. SHIELDS and JOHN A. CAMM, citizens of the United States, residing at Cleveland, in the county of Cuyahoga and State of Ohio, have invented a certain new and useful Improvement in Machine Tools, of which the following is a full, clear, and exact description, reference being had to the accompanying drawings.

This invention relates to machine tools and especially to milling machines of the type having a column, a spindle, and a spindle drive thereon.

The invention more particularly relates to a novel means for locking the spindle against rotation while the arbor and work are adjusted with reference to the spindle, the locking means being interlocked with the power clutch in such manner that the clutch cannot be thrown in to start the machine while the spindle is locked and the spindle cannot be locked while the power clutch is in engagement with the power shaft. The object of the invention is generally to improve the locking devices and interlocking connections, especially those devices which are adapted to the purpose above set forth, the improvements particularly residing in the simplicity of the parts and their arrangement whereby they may be manufactured at a minimum cost and assembled with a minimum expenditure of time and labor.

For a better understanding of the novel features of this invention as above set forth and others which will appear hereinafter, reference may be had to the drawings accompanying this specification wherein Fig. 1 is a side elevation of a milling machine embodying this invention, certain of the parts of the machine being broken away or entirely omitted for convenience in illustration; Fig. 2 is a vertical sectional view on the line 2—2 of Fig. 1; Fig. 3 is an enlarged view of the locking devices; Fig. 4 is a view similar to Fig. 3 showing the locking position of the devices; Fig. 5 is a sectional view on the line 5—5 of Fig. 3 and Fig. 6 is a sectional view on the line 6—6 of Fig. 4.

Referring to the drawings where like numerals refer to similar parts throughout, a milling machine is illustrated as mounted on a base 1 and having projecting upwardly therefrom a column 2, a knee 3 being vertically adjustable on guideways formed on the column walls and carrying a work table 4 thereon in the usual manner. The work table 4 carries the work 5 which is being operated upon by the cutter 6, the latter being carried by the arbor 7 which is mounted between the centre pin 8 and the inner end of the spindle 9. The spindle 9 is journaled in the walls of the hollow column 2, the outer bearing being designated generally at 10 and comprising the usual reversely tapered sleeves 11. The spindle 9 carries on its overhanging end a hand wheel 12, the latter being loosely mounted thereon but capable of movement longitudinally of the spindle for clutching engagement with a cooperating clutch member 13, the latter being threaded to the spindle 9. By means of this hand wheel the spindle 9 may be adjusted to any desirable angular position. On the lower part of the column 2, below the spindle 9 and parallel thereto, is journaled a transmission shaft 14 which may be driven from the power means or pulleys 15 through the cooperation of clutch members 16 and 17. The clutch member 16 is fixed to rotate with the pulley 15 and the clutch member 17 comprises a sleeve slidably keyed to the shaft 14. The sleeve 17 may be moved back and forth by means of a pair of arms 18 projecting down from a cylindrical member 19 which is journaled to the shaft 20, the latter being mounted above and at right angles to the shaft 14, and being journaled in suitable bearings formed in the walls of the column casing. The arms 18 carry trunnions which play in an annular race-way formed in the periphery of the sleeve of the clutch member 17. To the cylindrical structure 19 is fixed a crank arm 22 and this crank arm is connected by means of the connecting link 23 with a crank arm 24 fixed to an oscillating shaft 25 mounted above the level of the shaft 20 but parallel thereto and on the opposite side of the column 2 therefrom. The shaft 25 is also journaled in the column walls and carries on either overhanging end thereof an operating handle 26 whereby the clutch member 17, through the connections just described, may be thrown in and out of engagement with the clutch member 16 to drive the shaft 14.

The shaft 14 may be geared to the spindle 9 through a system of variable speed gearing, this speed gearing forming no part of the present invention. By means of this gearing referred to, which is designated generally by numerals 27, 28 and 29, the spindle 9 may be driven at various speeds to cause the cutter 6 to operate on the work 5, a spur gear 30, which is in mesh with the gear 29 being fixed to the spindle 9 within the hollow column 2 for driving the same. In a side wall of the column 2 and in alignment with the spur gear 30 is formed an opening and in this opening is anchored a closely fitting cylindrical member 31, the latter projecting inwardly at right angles to the spindle and in close proximity to the periphery of the spur gear 30. The inner end of the cylindrical member 31 is open but its outer end is closed by means of an integral flanged plate 32, the plate 32 being larger than the cylindrical member 31 and adapted to be secured to the column wall in any suitable manner, as by means of screw bolts 33. Within the cylindrical member 33 is disposed a plunger 34 the inner end of which has spur teeth 35 which are adapted to intermesh or interlock with the teeth of the spur gear 30 when the plunger is actuated in a direction to lock the spur gear 30 and spindle 9 in a stationary position. The plunger is provided on its outer end with a central longitudinal recess 36, the outer part of this recess being provided with a screw thread for cooperation with an adjusting screw 37, and the latter being fixed to a stub shaft 38 which has a collar or annular shoulder 39 disposed between the screw 37 and the flange plate 32 and carries on its outer end an operating handle 40 for rotating the screw 37 and thereby advancing the plunger 34 towards or retracting it from the spur gear 30. The handle 40 is provided with a spring pressed locking pin 41, the latter being adapted to enter the recess 42 in the flange plate 32 for locking the shaft 38 in a stationary position when the spur teeth 35 are either engaged or disengaged with the spur gear 30. The plunger 34 is formed on its upper side with a curved longitudinal slot for the reception of a key 43, the underside of the key 43 being curved to correspond with the curvature of the slot, and the upper part of the cylindrical member 31 being provided with a longitudinal key-way receiving and cooperating with the key for preventing the rotation of the plunger 34 when the screw 37 is rotated. The shaft 25 has fixed thereto a crank arm 44, the latter being mounted to assume a vertical position in the normal or unclutched position of the power clutch, and this crank arm 44 has pivoted thereto an interlocking rod 55, the latter projecting upwardly at an angle to the vertical and the free end thereof entering a transverse recess or opening 46 in the cylindrical member 31. The plunger 34 is provided with a transverse recess 47 which is adapted to register with the opening 46 when the plunger 34 is in the full retracted position, but in every other position of the plunger the recess 47 and the opening 46 are out of register. The operation is as follows: When it is necessary to make adjustments, either of the cutter or the spindle, the operator, by the manipulation of either of the handles 26, throws out the power clutch 16, 17. The throwing out of this clutch causes the withdrawal of the locking rod 55 from the recess 47 in the plunger 34 and the operator may then turn the handle 40 and thereby operate the screw 37 to advance the plunger teeth 35 into locking engagement with the spur teeth on the spur gear 30, the spur gear 30 and the spindle 9 being thereby securely locked in a stationary position. Any adjustment of the work 5, arbor 7 or cutter 6 may then be made with absolute safety from any inconvenience caused by the inadvertent starting of the machine while the spindle is locked and the adjustments are being made, the power clutch 16, 17 being now locked in the open position due to the out of register positions of the opening 46 and the recess 47. The power clutch cannot be thrown in again to start the machine until the plunger 34 is brought back to the retracted position where the recess 47 registers with the opening 46. It is also obvious that the plunger 34 cannot be advanced while the machine is operating since when the power clutch is in operative position the free end of the locking rod 55 passes through the opening 46 and enters the recess 47.

In accordance with the requirements of the statutes we have set forth our invention in the specific manner required and as embodied in one particular type of machine tools, but it is understood that certain features of the locking mechanism may be equally adapted to other types of machine tools and that the claims hereto annexed are not to be limited to the specific devices set forth except as is specifically recited therein or is rendered necessary by a consideration of the prior art.

Having thus described our invention, what we claim is:—

1. In an apparatus of the type described, a column comprising a hollow rectangular casing, a spindle passing through and journaled in the walls of said column, said spindle being adapted to receive an arbor on one overhanging end and an adjusting hand wheel on the other, a transmission shaft journaled in said column walls below said spindle and parallel arranged with reference thereto, a system of gearing interposed between said shaft and said spindle, said gearing comprising a spur gear fixed to said spindle, a power driven sleeve mounted on an end of said shaft, a clutch member keyed to and shiftable along said shaft into engagement with said sleeve, a cylindrical member anchored in an opening in the side wall of said column and having a flange plate covering its outer end, said member being on a level with but at right angles to said spindle and projecting inwardly to a point closely adjacent the periphery of said spur gear, said cylindrical member having a transverse opening in one side thereof, a plunger disposed within said member and slidably keyed thereto, the inner end of said plunger having spur teeth for engagement with said spur gear, said plunger having a central longitudinal recess formed on its outer end and a transverse recess on its side, a screw shaft journaled in said flange plate and having a screw threaded end cooperating with said central recess in the plunger for actuating the plunger, a bell crank lever for controlling said clutch member, an operating handle attached thereto, and a locking rod pivoted at one end to said lever and having its free end playing in said transverse opening in the wall of said cylindrical member, said latter opening being adapted to register with the transverse recess in said plunger when the plunger is in the retracted position.

2. In an apparatus of the type described, a supporting frame work spindle journaled in said frame work, said spindle being adapted to receive an arbor on one end, a transmission shaft journaled in said frame work, a system of gearing interposed between said shaft and said spindle, said gearing comprising a spur gear fixed to said spindle, a power driven member journaled on said shaft, a clutch member keyed to and shiftable along said shaft into engagement with said member, a cylindrical member anchored in an opening in the side wall of said column, said member being on a level with but at right angles to said spindle and projecting inwardly to a point closely adjacent the periphery of said spur gear, said cylindrical member having a transverse opening in one side thereof, a plunger disposed within said member and slidably keyed thereto, the inner end of said plunger having spur teeth for engagement with said spur gear, said plunger having a central longitudinal recess formed on its outer end and a transverse recess on its side, a screw shaft having a screw threaded end cooperating with said central recess in the plunger for actuating the plunger, a bell crank lever for controlling said clutch member, an operating handle attached thereto, and a locking rod pivoted at one end to said lever and having its free end playing in said transverse opening in the wall of said cylindrical member, said latter opening being adapted to register with the transverse recess in said plunger when the plunger is in the retracted position.

3. In an apparatus of the type described, the combination of a spindle, a power shaft, a system of gearing interposed between said power shaft and said spindle, a power clutch interposed between said gearing and said shaft, control means for operating said power clutch, a locking device for locking one of the gears of said system in a stationary position, and means interposed between said locking devices and said operating means for preventing the operation of the clutch while the gear is locked or preventing locking the gear when the power clutch is in operation.

4. In an apparatus of the type described, the combination of a power shaft, a spindle, a system of gearing interposed between said spindle and said drive shaft comprising a spur gear, a power clutch interposed between said gearing and said power shaft, a locking member adapted to be advanced to a position in the path of the teeth of the spur gear and thereby lock the same in position, means for actuating said locking member, means for operating said clutch, and interlocking connections between said actuating means and said operating means for preventing the operation of the locking device while the clutch is in engagement with the power shaft and preventing the operation of the clutch while the locking device is in operation.

5. In an apparatus of the type described, the combination of a hollow column, a power shaft journaled in the walls thereof, a spindle also journaled in the walls thereof, a power transmission system interposed between said power shaft and said spindle, said system comprising a spur gear fixed to said spindle, a power clutch interposed between said power shaft and said system of gearing, a locking member mounted in one of the walls of said column, said locking member being movable at right angles to said spindle and adapted to engage the teeth of said spur gear to lock the spindle against rotation, means for advancing said locking member toward said spur gear, and interlocking connections between said power clutch and said locking member whereby the power clutch is locked in inoperative position while the locking member is in locking position, and the locking device is locked in the inoperative position when the power clutch is in engagement with the power shaft.

6. In an apparatus of the type described, the combination of a hollow column, a shaft journaled in the walls thereof, a power driven member journaled on said shaft, a spindle also journaled in the walls of said column, a power transmission system interposed between said shaft and said spindle, said system comprising a spur gear fixed to said spindle, a power clutch interposed between said shaft and said power driven member, a locking member mounted in one of the walls of said column, said locking member being movable at right angles to said spindle and adapted to engage the teeth of said spur gear to lock the spindle against rotation means for advancing said locking member toward said spur gear, and interlocking connections between said power clutch and said locking member, said connections being adapted to obstruct the advancement of either the power clutch or the locking member while the other is in operative position.

7. In apparatus of the type described, the combination of a column comprising a hollow rectangular casing, a power shaft journaled in the walls thereof, a spindle also journaled in the walls thereof, a system of gearing interposed between said spindle and said power shaft comprising a spur gear fixed to said spindle, a power clutch interposed between said system of gearing and said power shaft, a cylindrical member anchored in a side wall of the column and projecting toward the periphery of said spur gear and at right angles to the spindle, a plunger slidably keyed within said cylindrical member, said plunger having spur teeth adapted to engage the teeth of said spur gear in the advanced position thereof, said plunger also having a screw threaded opening in one end, a hand operated screw cooperating with said threaded opening for advancing the plunger, said cylindrical member having a transverse opening in one side thereof and said plunger having a transverse recess adapted to register with said opening in the retracted position of the plunger, hand operated mechanism for operating said clutch and a locking rod pivoted thereto and having its free end disposed within said transverse opening in said cylindrical member and adapted to enter said recess when the clutch is in engagement with the power shaft.

8. In apparatus of the type described, the combination of a column, a power shaft journaled therein, a spindle also journaled therein, a system of gearing interposed between said spindle and said power shaft comprising a spur gear fixed to said spindle, a power clutch interposed between said system of gearing and said power shaft, a cylidrical member anchored in said column and projecting toward the periphery of said spur gear and at right angles to the spindle, a plunger slidably keyed within said cylindrical member, said plunger having spur teeth on its forward end adapted to engage the teeth of said spur gear in the advanced position, said plunger also having a screw threaded opening in its rearward end, a hand operated screw for cooperating with said threaded opening and advancing the plunger, said cylindrical member having a transverse opening in one side thereof and said plunger having a transverse recess adapted to register with said transverse opening in said cylindrical member in the retracted position of the plunger, hand operated mechanism for operating said clutch and a locking rod pivoted thereto and having its free end disposed within said transverse opening in said cylindrical member, said rod being adapted to enter said recess when the clutch is in engagement with the power shaft but to be withdrawn therefrom when the clutch is in operative position.

In testimony whereof, we hereunto affix our signatures.

FRANK S. SHIELDS.
JOHN A. CAMM.